US007818402B1

(12) United States Patent
Zhang

(10) Patent No.: US 7,818,402 B1
(45) Date of Patent: Oct. 19, 2010

(54) METHOD AND SYSTEM FOR EXPEDITING PEER-TO-PEER CONTENT DELIVERY WITH IMPROVED NETWORK UTILIZATION

(75) Inventor: Xinyan Zhang, Nanjing (CN)

(73) Assignee: Roxbeam Media Network Corporation, Roadtown, Tortola (VG)

( * ) Notice: Subject to any disclaimer, the term of this patent is extended or adjusted under 35 U.S.C. 154(b) by 657 days.

(21) Appl. No.: 11/350,625

(22) Filed: Feb. 8, 2006

(51) Int. Cl.
G06F 15/16 (2006.01)
(52) U.S. Cl. .................................. 709/219; 709/231
(58) Field of Classification Search .................. 709/219, 709/229, 231
See application file for complete search history.

(56) References Cited

U.S. PATENT DOCUMENTS

| | | | | |
|---|---|---|---|---|
| 6,434,620 | B1 * | 8/2002 | Boucher et al. | 709/230 |
| 2002/0161908 | A1 * | 10/2002 | Benitez et al. | 709/231 |
| 2003/0002521 | A1 * | 1/2003 | Traversat et al. | 370/465 |
| 2003/0051066 | A1 * | 3/2003 | Pace et al. | 709/316 |
| 2003/0163399 | A1 * | 8/2003 | Harper et al. | 705/35 |
| 2003/0210686 | A1 * | 11/2003 | Terrell et al. | 370/389 |
| 2004/0128343 | A1 * | 7/2004 | Mayer | 709/203 |
| 2005/0010653 | A1 * | 1/2005 | McCanne | 709/219 |
| 2006/0106473 | A1 * | 5/2006 | Enright et al. | 700/96 |
| 2007/0174471 | A1 * | 7/2007 | Van Rossum | 709/229 |
| 2008/0282036 | A1 * | 11/2008 | Ganesan | 711/129 |

FOREIGN PATENT DOCUMENTS

WO    WO 2005/079020    8/2005

OTHER PUBLICATIONS

W. R. Stevens, "TCP/IP Illustrated," vol. 1, Ch. 1 et seq., Addison-Wesley (1994).
Zhang et al., "Coolstreaming/DONet: A Data-driven Overlay Network for Peer-to-Peer Live Media Streaming," INFOCOM 2005, 24th Ann. Jt. Conf. of the IEEE Comp. and Comm. Societies, Proc. IEEE vol. 3, 13-17, pp. 2102-2111 (Mar. 2005).

* cited by examiner

*Primary Examiner*—Jeffrey Pwu
*Assistant Examiner*—Gerald Smarth
(74) *Attorney, Agent, or Firm*—Park, Vaughan & Fleming LLP

(57) ABSTRACT

One embodiment provides a method and a system for expediting content delivery in a peer-to-peer overlay network. A local cache and directory server caches a multiplicity of segments for multi-media content, and maintains a mapping between cacheable content and one or more local partner nodes that transiently stage segments for the cacheable content. The local cache and directory server receives a request identifying requested content, which may or may not be cached or mapped. The cache and directory server determines a match to the requested content in the mapping and sends a list of local partner nodes that transiently stage segments for the requested content based on the match.

20 Claims, 6 Drawing Sheets

METHOD AND SYSTEM FOR EXPEDITING PEER-TO-PEER CONTENT DELIVERY WITH IMPROVED NETWORK UTILIZATION

FIELD OF THE INVENTION

The present invention relates to techniques for delivering content over networks. More specifically, the present invention relates to a method and a system for expediting content delivery in a peer-to-peer overlay network.

BACKGROUND OF THE INVENTION

The ubiquity of Internet connectivity and the unprecedented growth in network access bandwidth have been fueling the demand for more versatile forms of on-line content. In particular, content providers are catering to an increasing demand for multi-media content, such as audio and video, over the Internet. Existing Internet applications fail to provide an effective means for delivery of bandwidth-intensive multimedia content to end-users.

Video is one of the most bandwidth-demanding forms of on-line content. Traditionally, video, particularly live video, and audio, have been broadcast over cable programming networks. Bandwidth-demanding video signals, such as television (TV) content, have only been offered by the cable programming networks. Although broadband cable service can provide both data-communication connectivity and cable programming to end-users, cable programming is often carried separately from data services. Consequently, end-users are not able to enjoy high-bandwidth audio or video content over broadband networks that offer Internet connectivity but not cable programming.

Successful delivery of high-quality video and audio content over an Internet connection is subject to several constraints. Access bandwidth historically presented one throughput bottleneck. For example, dial-up Internet services generally limit access bandwidth to 56 Kbps. Recent developments in access technologies, such as ADSL, VDSL, direct Ethernet connection, and WLAN, have largely removed this bottleneck by bringing multi-Mbps connections to end-users. Despite these recent developments, factors other than bandwidth limits, such as server overloading and network congestion, still pose potential constraints.

Most constraints not directly caused by limited link bandwidth are often the result of centralized data transfer, where media content is delivered based on a client-server model. An end-user starts a client program, which contacts a server where the content is stored, and downloads the content from the server. Although the network connection may provide sufficient bandwidth to accommodate multiple video channels, the server may become overloaded when numerous end-users simultaneously request streaming video. In addition, the connection may be congested with other network traffic. High-performance servers and high-bandwidth network connections can mitigate these problems, but such solutions are not scalable and inevitably increase service-provisioning costs.

Peer-to-peer (P2P) overlay networks have attracted growing interest as a solution to delivering high-quality video content. A P2P network is formed as a logical layer operating over a conventional network infrastructure, such as the Internet. In a P2P network, peer nodes are aware of the states of other peer nodes and a group of peer nodes can directly exchange data or services among themselves. The task of content delivery is not undertaken by one particular server. Thus, P2P networks provide a favorable environment for delivering streaming data, such as video, because server overloading is avoided and network congestion is reduced. P2P networks also scale gracefully as users increase.

An efficient P2P network requires sufficient content-delivery bandwidth while minimizing network utilization. The prevalence of P2P applications has lead to a significant increase in bandwidth consumption, which causes a corresponding increase in the network operation costs. Recently, Internet traffic has surged due to an increase in World Wide Web (WWW) applications. Internet service providers (ISPs) mitigate associated operation costs through Web caching. In a typical configuration, a Web cache server resides near a gateway in an ISP's network, intercepts Web page requests, and responds with cached Web pages. Web caching reduces end-to-end traffic and the burden placed on Web servers. One exemplary Web caching solution is provided by Akamai, Inc., Cambridge, Mass.

Web caching, however, cannot easily migrate onto a P2P network. Unlike Web applications, different P2P applications support different protocols and port numbers. Identifying P2P traffic can be difficult. PCT Patent Application WO 2005/079020, to Twiss, the disclosure of which is incorporated by reference, discloses differentiating P2P traffic from other Internet traffic at a router to allow caching in a P2P network. Nevertheless, low network efficiency problems can remain. For instance, a P2P network may involve a central directory server, from which a node can request a list of peer nodes for downloads. The directory server lacks knowledge of location-specific content-distribution states. As a result, the peer nodes identified by the directory server might be scattered over the entire Internet, resulting in inefficient, slow, and unstable downloading. Additionally, the requesting node cannot learn whether a copy of the content is available locally, as the directory server lacks locality information.

Hence, there is a need for a method and a system for expediting P2P content delivery with improved network utilization.

SUMMARY OF THE INVENTION

One embodiment provides a method and a system for expediting content delivery in a peer-to-peer overlay network. A local cache and directory server caches a multiplicity of segments for multi-media content, and maintains a mapping between cacheable content and one or more local partner nodes that transiently stage segments for the cacheable content. The cache and directory server receives a request identifying requested content, which may or may not be cached or mapped. The local cache and directory server determines a match to the requested content in the mapping and sends a list of local partner nodes that transiently stage segments for the requested content based on the match.

A further embodiment provides a system for expediting content delivery in a peer-to-peer overlay network. A local peer node sends a first request identifying requested multi-media content divided into segments, whereas a local cache and directory server caches a multiplicity of segments. A router forwards the request to the local cache and directory server, which responds by indicating whether any local peer nodes or the cache transiently stage segments for the requested content. The router forwards a second request to a central directory server based on the absence of segments for the requested content in the local peer nodes and the cache.

Still other embodiments will become readily apparent to those skilled in the art from the following detailed description, which describes embodiments of the invention by way of illustrating the best mode contemplated for carrying out the invention. As will be realized, the invention is capable of other and different embodiments and its several details are capable of modifications in various obvious respects, all without departing from the scope of the present invention. Accordingly, the drawings and detailed description are to be regarded as illustrative in nature and not as restrictive.

DETAILED DESCRIPTION

Delivery of TV Signals Over Cable Programming Networks

Figure 1:
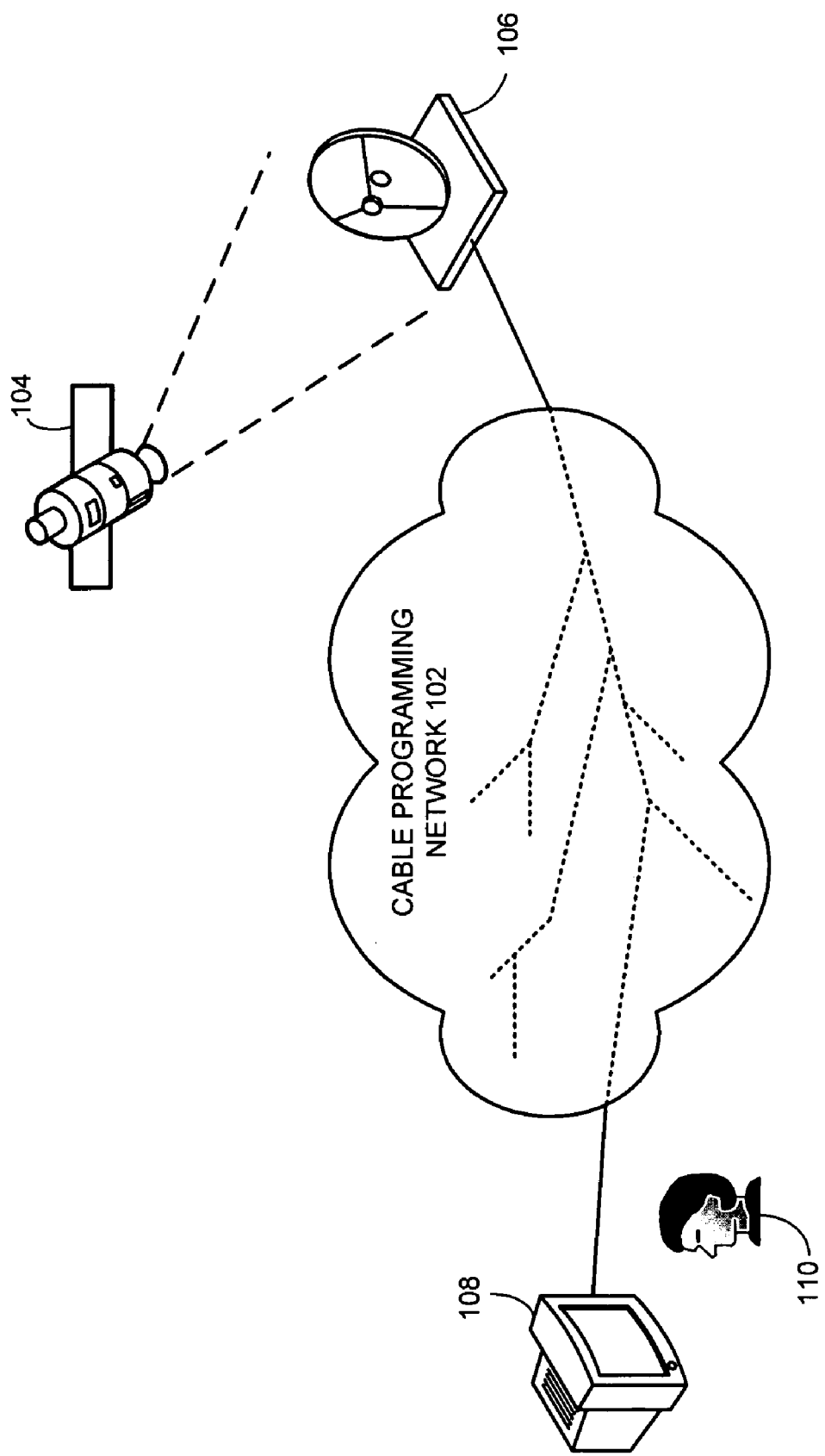
FIG. 1 illustrates a prior art conventional cable programming network, which is used to deliver TV signals to end-users.

FIG. 1 illustrates a prior art conventional cable programming network 102 for delivering TV signals to end-users. The head-end of the cable programming network 102 is in communication with a satellite base station 106. The base station 106 receives signals for several TV channels relayed by a satellite 104. The base station 106 also encodes the received TV signals and transmits the signals onto the cable programming network 102.

The cable programming network 102 can be implemented over a conventional coaxial-cable network or an optical-fiber network. At the user-end, a copper coaxial cable typically carries the TV signals into an end-user's residence or office. A TV set or receiver 108 receives the TV signals and presents the media content.

Cable networks are usually formed in tree topologies to transmit signals downstream from the head-end to the tail-end. A coaxial cable can accommodate several TV channels simultaneously due to the large bandwidth available. In contrast, accommodating simultaneous transmission of multiple TV channels over an Internet connection can be difficult due to significantly less available bandwidth in an access network.

Currently, ISPs offer Internet services over broadband cable networks, which are capable of offering significantly higher downstream bandwidth. Other types of cable networks are possible. Nevertheless, due to the tree topology of cable networks, upstream bandwidth is shared by multiple Internet users and is limited on a per-user basis. Furthermore, although TV signals and Internet traffic can be carried over the same physical medium, the signals are transmitted independently. As a result, TV signals are usually unavailable in networks offering only Internet connectivity.

Receiving and Presenting P2P Streaming Media Content

P2P networks have emerged as an effective solution to distributing objects that require significant network bandwidth and resources, such as audio or video files. In particular, a P2P network can deliver bandwidth-demanding streaming media by operating as a logical layer over an existing network infrastructure, such as the Internet or a wireless cellular network. A node in a P2P network not only requests and receives data from other peer nodes, but also shares locally stored data with other peer nodes. Thus, a P2P-based content delivery system can avoid potential server overload and network congestion by distributing content among peer nodes.

Figure 2:
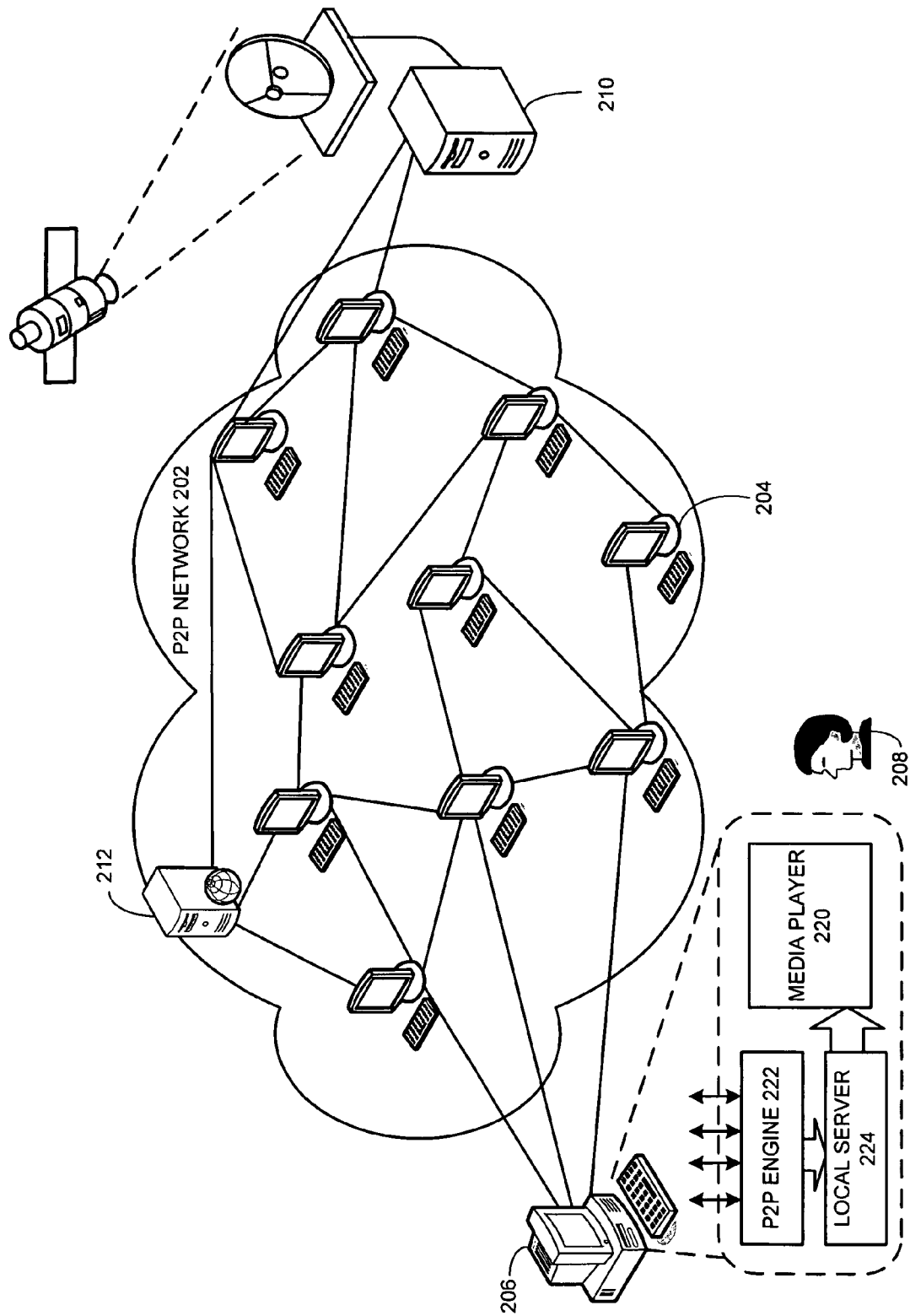
FIG. 2 illustrates a host facilitating a P2P engine and a local server for presenting streaming media content received over a P2P network.

FIG. 2 illustrates a host facilitating a P2P engine and a local server for presenting streaming media content received over a P2P network. An originating node 210 is in communication with a satellite base station and receives data for media content. Peer nodes, such as computer 204, form a P2P overlay network 202. A peer node can be any device capable of receiving or transmitting data, such as a cell phone, a personal data assistant (PDA), or a laptop computer. The P2P network 202 can be formed as a logical layer over an underlying network infrastructure, such as the Internet or a wireless cellular network, which can be implemented in accordance with the Transmission Control Protocol/Internet Protocol (TCP/IP), such as described in W. R. Stevens, "TCP/IP Illustrated," Vol. 1, Ch. 1 et seq., Addison-Wesley (1994), the disclosure of which is incorporated by reference. Other network infrastructures are possible.

A P2P overlay network uses widely-available one-to-one unicast links. A one-to-one link is a point-to-point or end-to-end communication link between two nodes in a packet-switched network implemented, for instance, using TCP/IP, although other network implementations or protocols are possible. P2P overlay networks provide an application-level solution, which uses unicast links across cooperating and participating nodes, called overlay nodes or peer nodes. An overlay network provides multicasting by relaying data among the peer nodes. An exemplary implementation of an overlay node is described in X. Zhang et al., "Coolstreaming/DONet: A Data-driven Overlay Network for Peer-to-Peer Live Media Streaming," INFOCOM 2005, 24th Ann. Jt. Conf. of the IEEE Comp. and Comm. Societies, Proc. IEEE Vol. 3, 13-17, pp. 2102-2111 (March 2005), the disclosure of which is incorporated by reference.

During operation, an originating node 210 sends media content to neighboring nodes, which are in communication with other peer nodes. The P2P network 202 also includes a directory server 212, which maintains a list of peer nodes that store a copy of the media content. In one embodiment, the directory server 212 resides on the same host as the originating node 210. The address of the directory server 212 is assumed to be universally known within the P2P network 202. When joining the P2P network 202, a new node contacts the directory server 202 to request a list of peer nodes that transiently stage the requested content, such as a video file or a media stream. In one embodiment, such peer nodes are called partner nodes. The requesting node subsequently requests the content from a set of partner nodes. The P2P network 202 facilitates delivery of both individual files and streaming media of arbitrary or pre-determined length. Hence, content can be a regular file, streamed file, or media stream of arbitrary length. For example, a user can request a live TV channel, streamed movie file as video-on-demand (VOD), or simply a data file. For VOD or non-streaming file delivery, the content can be identified by a hash of the content data to identify parts of the same file. If the content is a media stream of arbitrary length, the content can be identified by a hash of the metadata for the media stream. Other file identification mechanisms are possible.

The content passes from node to node via intermediate communication links and propagates to an end host 206, which presents the received media content to an end-user 208. In one embodiment, a P2P engine 222 within the end host 206 is responsible for requesting a list of partner nodes, receiving data from multiple partner nodes, and transmitting locally stored data to other peer nodes. The P2P engine 222 is in communication with a local server 224 in the end host 206 and shares the received data with local server 224. The local server 224 channels the received data to a media player 220, which presents the streaming media content to user 208. The local server 224 allows the host 206 to use most conventional media-presentation applications, which are capable of playing content directly from a location identified, for example, by a Uniform Resource Locator (URL). The media player 220 receives the data from local server 224 by identifying the URL for the local server. In one embodiment, the media player 220 communicates with local server 224 by identifying a local IP address assigned to the host 206. At the beginning of a P2P streaming session, local server 224 can activate the media player 220 after the P2P engine 222 has received and buffered sufficient data to start playback.

Although the host 206 includes the local server 224, a local server is not necessary for the P2P engine 222 to operate. For example, the host 206 can include media-presentation software that can directly fetch data from the P2P engine 206.

Figure 3:
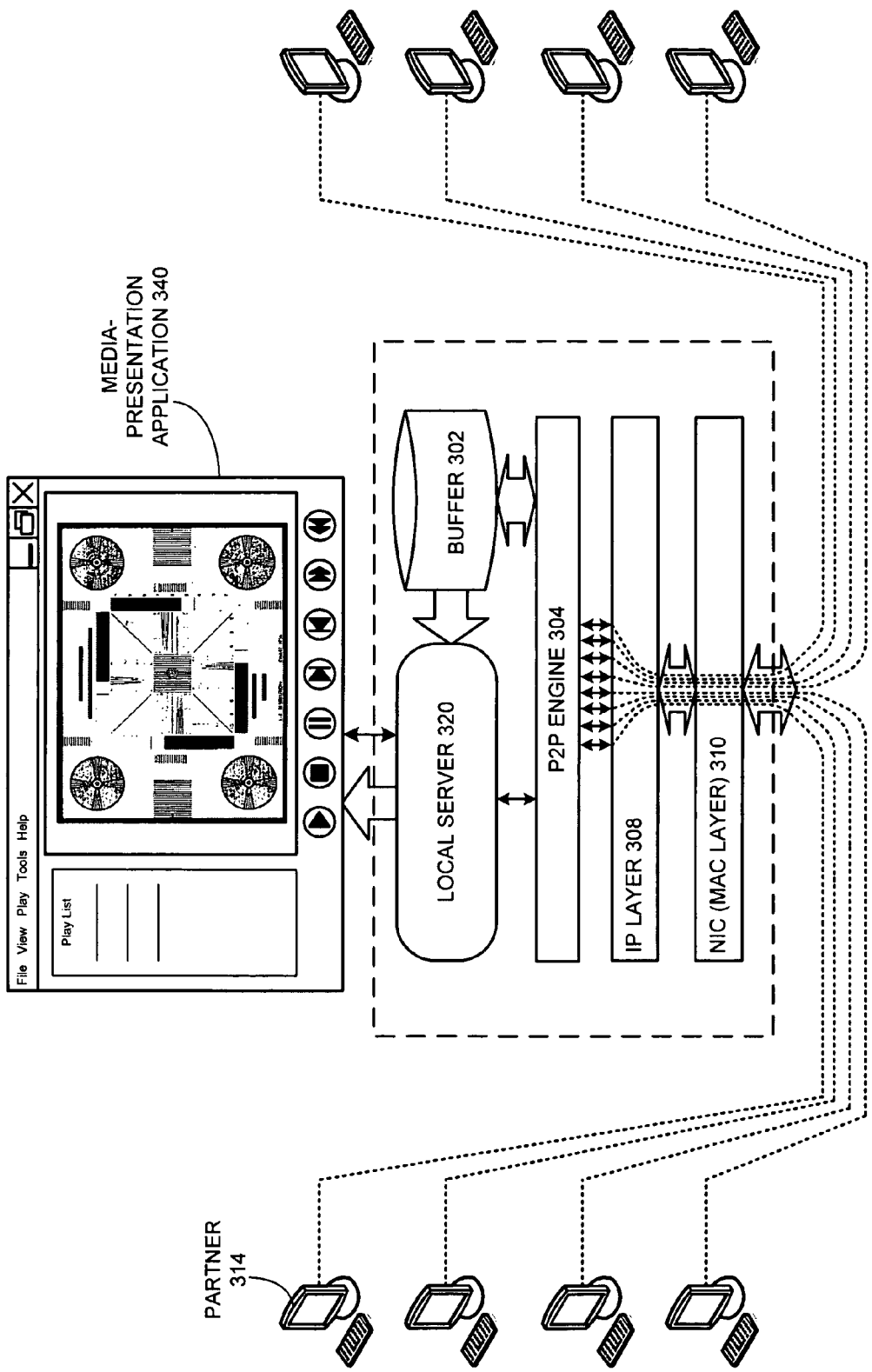
FIG. 3 presents a block diagram illustrating an exemplary architecture of a host facilitating a P2P engine for presenting streaming media content delivered over a P2P network.

FIG. 3 presents a block diagram illustrating an exemplary architecture of a host facilitating a P2P engine for presenting streaming media content delivered over a P2P network. An end host system includes a network interface card 310 that implements a Medium Access Control (MAC) layer and an Internet Protocol (IP) layer 308. The end host includes a P2P engine 304 and a buffer 302.

When a node issues a command to request content, the P2P engine 304 contacts a directory server to receive a list of partner nodes that transiently stage the content. The P2P engine 304 initializes a P2P session with multiple partner nodes, such as partner node 314, and requests data from the partner nodes. The P2P engine 304 subsequently starts receiving data from the partner nodes and stores the received data in a buffer 302. The P2P engine 304 can also retrieve the data stored in the buffer 302 and share the data with other peer nodes.

The end host includes a local server 320, which fetches data from the buffer 302 and channels the data to a media-presentation application 340. The local server 320 is initialized when a P2P session starts. When sufficient data has been received and stored in the buffer 302, the local server 320 calls the media-presentation application 340 to present the media content.

In one embodiment, streaming media content, such as a video stream, is divided into segments, which can be of uniform length. A Buffer Map (BM) represents the availability of the segments in a node's buffer. Each peer node continuously exchanges their BM with other peers and schedules segments to be fetched. Each local host also implements a logical sliding window that includes a block of consecutive segments. To facilitate smooth playback and advance the streaming of media, local hosts only request segments within the sliding window when requesting data from partner nodes. Additionally, each partner node advances the sliding window periodically as time progresses. By choosing a proper sliding-window size, a local host can allocate sufficient time for receipt of the segments and advance the media while minimizing the affect caused by a missing segment.

For example, a segment can carry one second of video. Assuming that a time latency greater than one minute is unlikely, a sliding window of at least 120 segments can cover two minutes of playback time, centered about the current time. In one embodiment, the system uses 120 bits to record a BM, with a "1" bit value indicating that a segment is available and a "0" bit value otherwise. The sequence number of the first segment in the sliding window can be recorded in two bytes, which can be rolled back for video programs lasting longer than 24 hours. Other suitable segment buffering schemes, including variations on the number and duration of segments, buffer size, segment representation, and so forth, are possible.

Providing Local Caching and Directory Service

A centralized, global directory server typically lacks knowledge of the state of a local network. For example, when a host requests content, the central directory server might lack the knowledge of whether the content is stored in a peer node in the vicinity of the requesting host. "Vicinity" can be defined physically or logically. For example, the peer node can be in the same local area network (LAN), corporate network, campus network, metropolitan network, or regional network. The peer node can also be located within a radius from the requesting host measured in a given network metric, such as hop count or aggregate bandwidth.

Due to lack of such local network knowledge, the list of partner nodes returned by the central directory server often includes partner nodes located remotely from the requesting host with regard to either physical distance or network metrics, and the network utilization of the P2P sessions can be low. To improve network utilization, a local caching and directory service is provided to expedite P2P content delivery.

In one embodiment, a local cache and directory server resides in a local network. A local network is not limited to a local area network (LAN), and can be of any pre-defined scope. For example, a local network can be a portion of or an entire ISP's network, a campus network, a corporation's global internal network, or a wireless service provider's network. A local network can also include one or more administrative domains, or a union of several homogeneous or heterogeneous networks. The local cache and directory server provides a cache that stores the content requested by the nodes within the local network. The cache can be any storage device, such as a hard disk, a semiconductor-based memory, or an optical storage medium. The cache can transiently stage or permanently store data for the cached media content. Additionally, the cache and directory server maintains a local directory that map content to corresponding local partner nodes that transiently stage content segments. In one embodiment, the service scope of a local cache and directory server corresponds to the scope of the local network. In further embodiments, multiple local cache and directory servers can provide caching and directory services to a local network.

Figure 4:
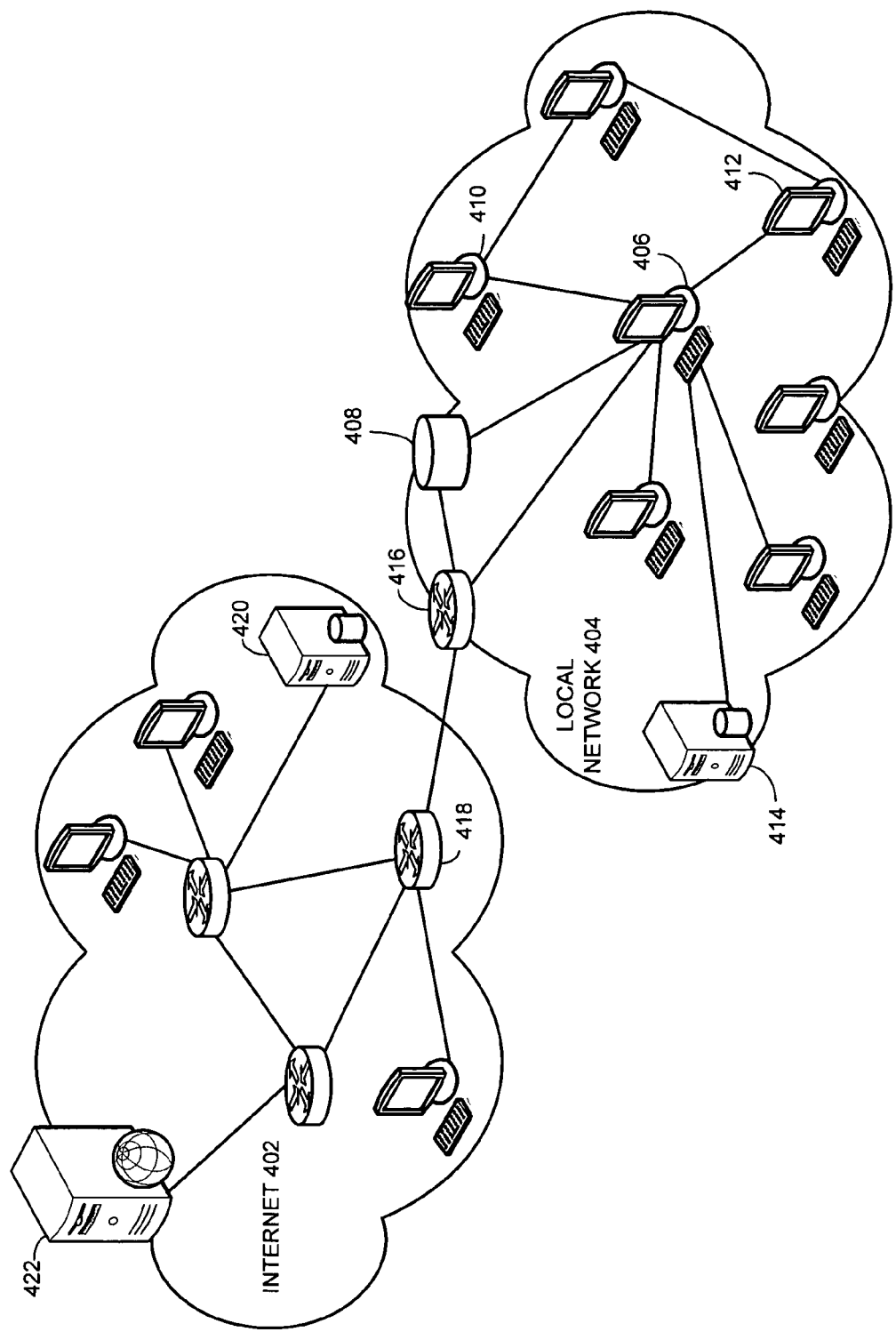
FIG. 4 illustrates how a local cache and directory server can expedite content delivery and improve the network utilization in a P2P network, in accordance with one embodiment.

FIG. 4 illustrates how a local cache and directory server can expedite content delivery and improve network utilization in a P2P network, in accordance with one embodiment. A local network 404 contains a multiplicity of peer nodes, such as peer nodes 410, 406, and 412. In one embodiment, the local network 404 can be a routing domain or an administrative domain, wherein the traffic from and to networks outside the local network 404 is routed through one or more gateway routers, such as router 416. For example, the gateway router 416 controls the routing of inbound and outbound traffic to the Internet 402. In further embodiments, the local network 404 can include multiple administrative domains and multiple gateway routers.

The Internet 402 includes a multiplicity of routers, such as router 418, which is in communication with the gateway router 416. The P2P overlay network includes a central directory server 402, which maps content to peer nodes. A content file server 420 in the Internet 402 stores the media content and serves as a content source. In one embodiment, multiple content file servers are present in the Internet 402. Furthermore, a content file server 414 can be present in the local network 404. Content file servers are optional in a P2P network where content is provided by the users instead of content providers. For P2P-based commercial broadcast applications, content providers can use content file servers to distribute the contents to a large number of users. For example, for VoD applications, the content file servers can store popular TV shows or movies for large-scale P2P distribution.

In one embodiment, a host within the local network 404 generates an initial directory request, which identifies content by the hash value of the file content or hash value of the metadata for a media stream. The host can further obtain the hash value corresponding to the content from, for example, a published Web site. The request is subsequently re-directed to a local cache and director server 408, which returns local caching and directory information. For example, the local host 406 sends an initial request to the central directory server 422 for a list of partner nodes for specific content. A gateway router 416 receives the request and handles all outbound traffic to the Internet 402. Instead of forwarding the request to the router 418, the gateway router 416 inspects the packet, determines that the packet is a P2P request packet to the central directory server 422, and forwards the request packet to the cache and directory server 408.

In one embodiment, the P2P application uses a pre-determined TCP or UDP port, and the gateway router 416 can distinguish a P2P packet by inspecting the packet's destination address and destination port type and number. In further embodiments, P2P applications need not use a fixed port number. One such embodiment uses a P2P packet-recognition method disclosed in published PCT Patent Application WO 2005/079020, "Methods and Apparatus for Routing in a Network," the disclosure of which is incorporated by reference, to identify P2P directory requests.

TABLE 1

| Hash Values | Partner Nodes |
| --- | --- |
| 14dad0ede7ad33878fd862a03e6af | 120.43.33.15 |
| | 120.43.1.91 |
| | 120.43.7.87 |
| | 120.43.128.0 |
| 2ace5aeb5e88ec9adc0771cd07f41d3b | 120.43.64.39 |
| | 120.43.128.0 |
| ... | ... |
| 615610032c78834aca46eeda6e1c5ef38a7 | 120.43.5.34 |

The cache and directory server 408 maintains a cache storing media content that has been requested by hosts within the local network 404. Additionally, the cache and directory server 408 maintains a directory that provides a mapping between content and corresponding local peer nodes that transiently stage segments for the content. TABLE 1 is an example local directory within the cache and directory server 408. In one embodiment, each entry is indexed by the hash value of the content or metadata for the content, and includes the IP address of the partner nodes that transiently stage segments for the content. The local network covers an administrative domain that includes IP addresses from 120.43.0.0 to 120.43.255.255. The cache and directory server 408's IP address is 120.43.128.0, and is listed with the IP addresses of other partner nodes in the second column if segments for content are available in the cache. In a further embodiment, each entry also includes a time stamp for every partner node's IP address. A partner node's presence in the directory expires after a period of time, unless the local cache and directory server 408 receives an update that indicates the availability of segments for the content staged on that partner node.

After receiving the redirected directory request, and if segments for the requested content segment are present in at least one local peer node or in the cache, the cache and directory server 408 replies with a list of the partner nodes. The cache and directory server 408 identifies itself as one partner node included in the partner-node list if segments for the content are present in the cache. In a further embodiment, the cache and directory server 408 uses the address of the central directory server 422 as the source address in the response packet. Hence, to the requesting host, the response packet appears to be from the central directory server 422. If the cache and directory server 408 does not store segments for the requested content in the cache, and if no matching partner node is found in the mapping, cache and directory server 408 directs the request back to the gateway router 416 and signals the gateway router 416 to forward the request to the central directory server 422.

If the requesting host cannot obtain sufficient bandwidth from the partner nodes returned by the cache and directory server 408, the requesting host sends another directory request. The cache and directory server 408 tracks the received requests. If the time gap between two requests from the same source for the same content is less than a pre-determined value, the cache and directory server 408 directs the second request to the router 416 and signals the router 416 to forward the second request to the central directory server 422. The requesting host thereby obtains a list of additional non-local partners or content file servers, which helps increase the download bandwidth.

The cache and directory server 408 stores segments for content for a pre-determined period of time to conserve storage space. If the content segment is a file, such as an episode of a TV show or movie, the file can remain in the cache as long as requests for the file are present. The cache and directory server 408 can delete a file if no requests are received for a period of time. If the content segment is a live media stream, the cache and directory server 408 can dynamically buffer a portion of, for example, the latest five minutes, of the stream. Other caching configurations are possible.

If the content segment is not present in the cache, and if at least one local peer node transiently stages segments for the content, the cache and directory server 408 replies with a list of local partner nodes. The cache and directory server 408 can subsequently initiate a P2P session to download segments for the content from the partner nodes. In a further embodiment, the cache and directory server 408 sends a request for a list of partner nodes and content file servers to the central directory server 422, and downloads segments for the content from these non-local partner nodes or one of the content file servers. The gateway router 416 distinguishes this request packet from other directory request packets by identifying the cache and directory server 408's source address, and can forward the request packet to the router 418, instead of sending the packet back to the cache and directory server 408.

In a still further embodiment, a content provider pushes newly-released VOD contents to the local cache and directory servers. For example, when a content provider releases a new movie and expects a large number of users to request the movie on the first day of release, the content provider can place the movie file on the content file servers. The content file servers initiate file transfers to the local cache and directory servers at a given time. Other content-push schemes are possible.

The cache and directory server 408 establishes the local directory based on announcement messages broadcast by the local peer nodes. Each peer node transiently staging segments for specific content periodically broadcasts a message to the node's partners, which indicates the node's availability to serve as a partner node for content segments, such as described in commonly-assigned pending U.S. patent application Ser. No. 11/192,760, filed 29 Jul. 2005, the disclosure of which is incorporated by reference. The cache and directory server 408 operates like a partner node for each stored content and receives announcement messages from a large number of peer nodes with regard to each content.

When a local peer node requests for content with segments not present in any local peer nodes or in the cache, the cache and directory server 408 sends the request back to the router 416 and signals the router 416 to forward the request to the central directory server 422 via the router 418. Further, the cache and directory server 408 obtains segments for the requested content, either from the non-local partner nodes or from one of the content file servers.

The router 416 is modified to implement the necessary forwarding policies. In one embodiment, the cache and directory server 408 is an add-on module, located together with the router 416. In a further embodiment, the cache and directory server 408 is a separate device, for example, a stand alone server, located away from the router 416.

Under certain circumstances, changing the forwarding policies on the router 416 may not be practical. A user can still benefit from the local caching and directory service by manually configuring the P2P application to include the address of the cache and directory server 408. The cache and directory server 408 operates similarly to the manner in which a Web proxy handles Web page requests, and processes each directory request before determining whether to forward the request to the central directory server 402.

Figure 5:
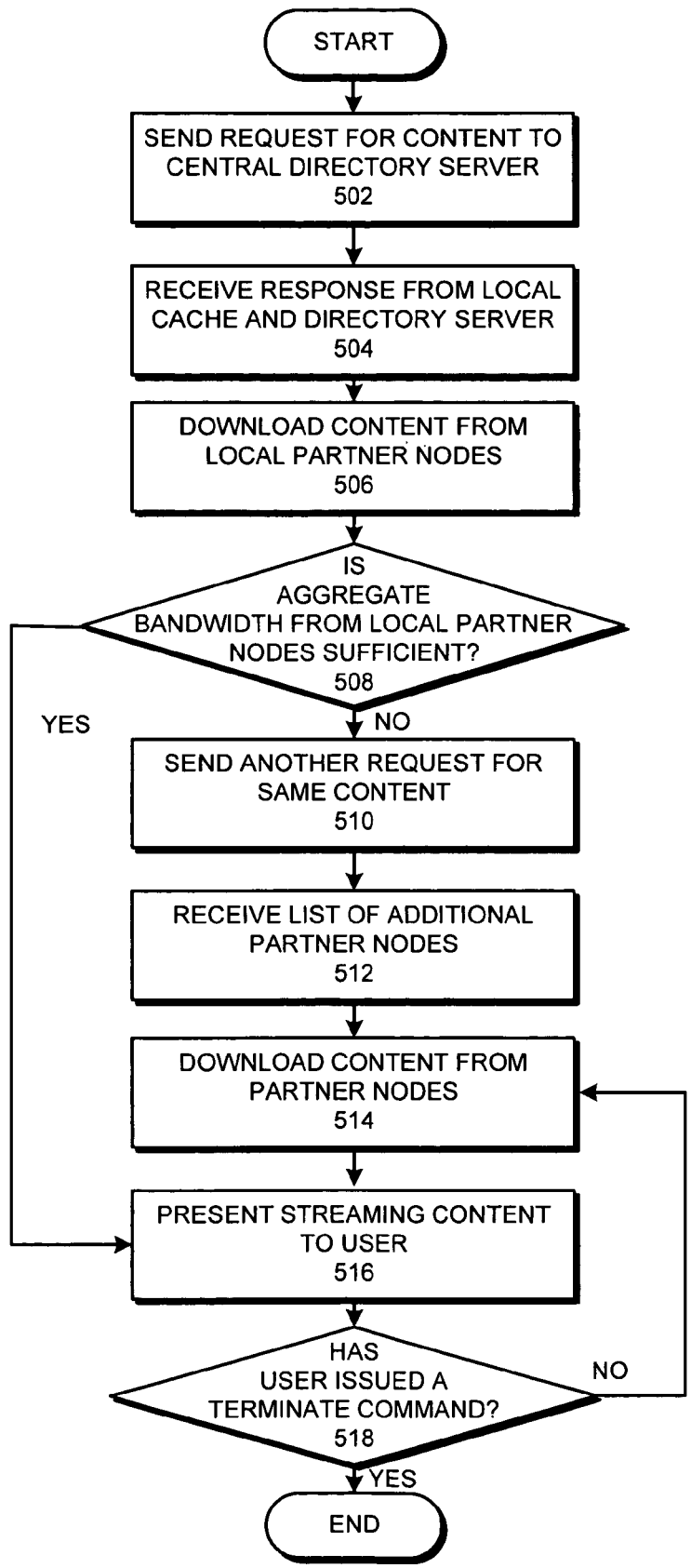
FIG. 5 presents a flow chart illustrating the process of a host receiving content from local peer nodes or a local cache and directory server, in accordance with one embodiment.

FIG. 5 presents a flow chart illustrating the process of a host receiving content from local peer nodes or a local cache and directory server, in accordance with one embodiment. The requesting host sends a request for content to the central directory server (step 502), which is intercepted by a local cache and directory server. The host subsequently receives a response from the cache and directory server that indicates the local partner nodes that transiently stage segments for the requested content (step 504). If segments for the content are present in the cache, the cache and directory server also appears in the partner-node list. The host then starts downloading the content from the local partner nodes (step 506).

The host further determines whether the aggregate bandwidth is sufficient for a streaming presentation (step 508). If sufficient, the host begins presenting the streaming content to a user (step 516). If not, the host sends another request to the central directory server for the same content (step 510). The cache and directory server identifies this request as a second request, which is forwarded to the central directory server. In response, the requesting host receives a list of additional non-local partner nodes (step 512), which can also include one or more content file servers. The host starts downloading the content from the partner nodes (step 514), and begins presenting the streaming content to the user (step 516). The host also monitors whether the user has issued a terminate command (step 518). If issued, the system exits. Otherwise, the system continues the download process (step 514).

Figure 6:
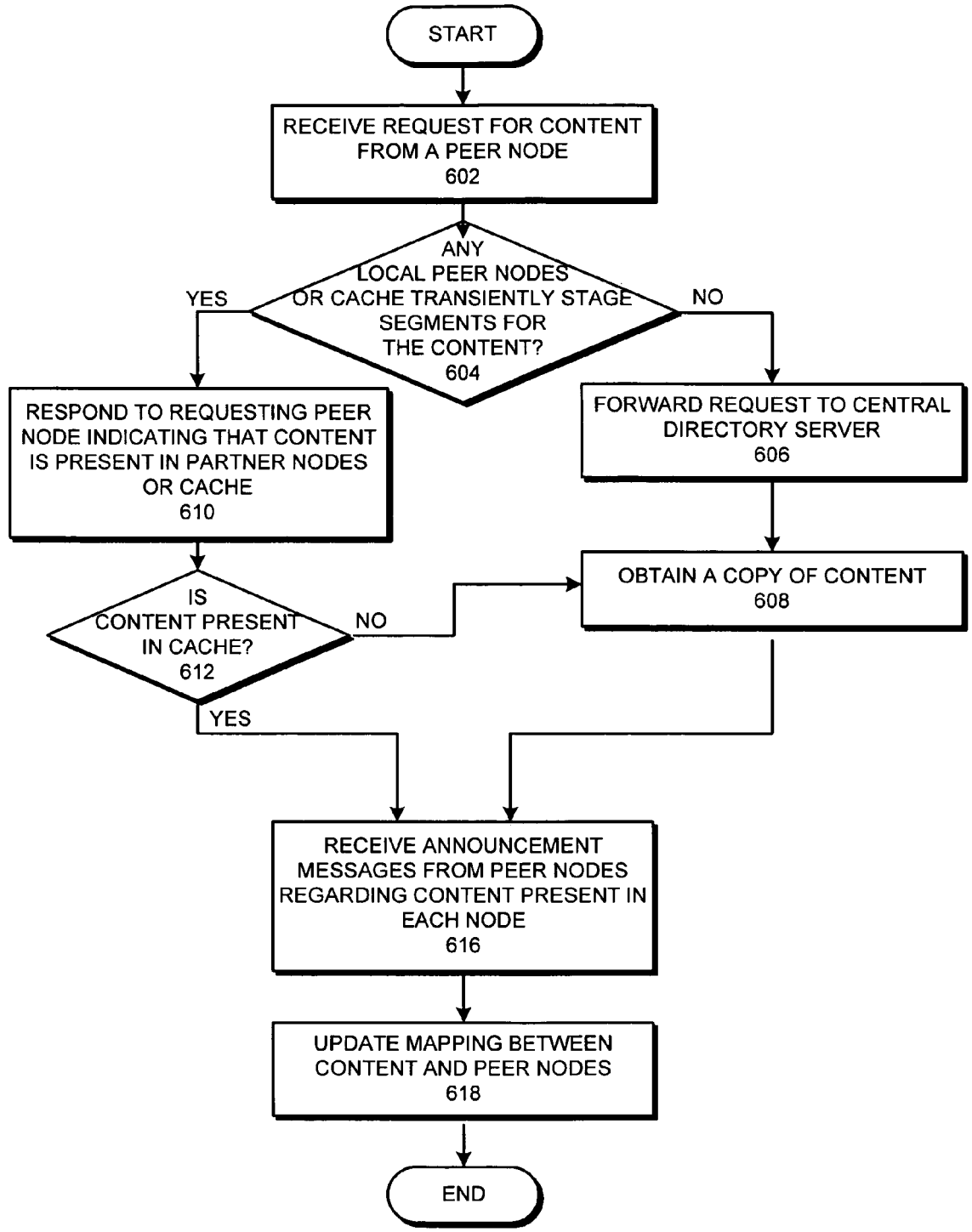
FIG. 6 presents a flow chart illustrating the process of a local cache and directory server responding to a request originated from a local host, in accordance with one embodiment.

FIG. 6 presents a flow chart illustrating the process of a local cache and directory server responding to a request originated from a local host, in accordance with one embodiment. The system receives a request for content from a local peer node (step 602). The system subsequently determines whether any local peer nodes or the cache transiently stage segments for the requested content (step 604). If segments for the content are neither present in any local peer nodes nor present in the cache, the system forwards the request to the central directory server (step 606). The system also obtains segments for the requested content (step 608) for caching purposes.

If segments for the requested content are present in at least one local peer node or in the cache, the system responds to the requesting host with a list of partner nodes (step 610). The system further determines whether segments for the content are present in the cache (step 612). If not present, the system obtains segments for the requested content for caching purposes (step 608).

When segments for the requested content are present in the cache, or after the system obtains segments for the content, the system further receives announcement messages from the peer nodes regarding content present therein (step 616). The system correspondingly updates the mapping between content and the peer nodes in the local directory (step 618).

While the invention has been particularly shown and described as referenced to the embodiments thereof, those skilled in the art will understand that the foregoing and other changes in form and detail may be made therein without departing from the scope of the invention.

What is claimed is:

1. A computer-implemented method for expediting content delivery in a peer-to-peer (P2P) overlay network, comprising:
    caching a plurality of segments associated with multi-media content in a local cache on a local cache and directory server within a local P2P network which includes a requesting peer node that requests a respective segment associated with the multi-media content;
    maintaining, at the local cache and directory server, a mapping between the multi-media content and another local peer node that transiently stages the segments associated with the multi-media content;
    receiving, at the local cache and directory server, a packet forwarded from a gateway router within the local P2P network, wherein the packet includes a request originated from the requesting peer node and identifies a segment associated with the multi-media content, and wherein the request is forwarded to the local cache and directory server in place of a central directory server within another local P2P network from the gateway router responsive to determining that the request is a P2P request based on packet attributes which comprise of a destination address, a destination port type, and a destination port number of the packet; and
    responsive to the multi-media content mapped to the other local peer node, sending an address of the other local peer node to the requesting peer node;
    responsive to the multi-media content not mapped to the other local peer node, forwarding, from the local cache and directory server, the request to the central directory server.

2. The method of claim 1, wherein the method further comprises allowing the requesting peer node to download segments associated with the multi-media content from the cache and directory server based on the presence of segments for the multi-media content in the cache.

3. The method of claim 1, wherein the method further comprises obtaining and storing segments for the multi-media content in the cache based on the absence of the segments in the cache.

4. The method of claim 3, wherein obtaining segments for the multi-media content involves receiving the segments from a plurality of peer nodes that transiently stage the segments.

5. The method of claim 3, wherein obtaining segments for the multi-media content involves receiving the segments from a content file server.

6. The method of claim 1, wherein maintaining the mapping involves associating one such local partner node with the multi-media content in response to a message indicating that the local partner node transiently stages segments for the multi-media content.

7. The method of claim 1, further comprising receiving a segment the transfer of which is initiated by a content file server.

8. A computer-implemented method for expediting content delivery in a peer-to-peer (P2P) overlay network, comprising:
sending a packet including a first request identifying multi-media content divided into segments;
receiving at a local cache and directory server a re-directed packet forwarded from a gateway router within a local P2P network, wherein the first request originated from a requesting peer node and identifies a segment associated with the multi-media content, and wherein the first request is forwarded to the local cache and directory server in place of a central directory within another local P2P network from the gateway router responsive to determining that the first request is a P2P request based on packet attributes which comprise of a destination address, a destination port type, and a destination port number of the packet,
receiving from the local cache and directory server identifiers of one or more local partner nodes that transiently stage segments for the multi-media content; and
sending a second request to a central directory server based on an insufficiency of bandwidth provided by the local partner nodes for presentation of the multi-media content.

9. The method of claim 8, wherein both the first and second requests are directed to a central directory server; and wherein in response to the second request, the method further comprises receiving identifiers of one or more content file servers and non-local partner nodes that transiently stage segments for the multi-media content.

10. The method of claim 9, further comprising specifying the identifier of a local cache and directory server for the first and second requests, thereby allowing the first and second requests to be delivered to the local cache and directory server.

11. A system for expediting content delivery in a peer-to-peer (P2P) overlay network, comprising:
a local peer node comprising a first processor, which executes a P2P application, and a first memory; and
a local cache and directory server, comprising:
a second processor;
a second memory;
a cache configured to cache a plurality of segments associated with multi-media content in a local cache on a local cache and directory server within a local P2P network which includes a requesting peer node that requests a respective segment associated with the multi-media content;

a mapping table configured to maintain a mapping between the multi-media content and another local peer node that transiently stages the segments associated with the multi-media content;
a request receiving mechanism configured to receive at the local cache and directory server a packet forwarded from a gateway router within the local P2P network, wherein the packet includes a request originated from the requesting peer node and identifies a segment associated with the multi-media content, and wherein the request is forwarded to the local cache and directory server in place of a central directory server within another local P2P network from the gateway router responsive to determining that the request is a P2P request based on packet attributes which comprise of a destination address, a destination port type, and a destination port number of the packet; and
a sending mechanism configured to send, responsive to the multi-media content mapped to the other local peer node, an address of the other local peer node to the requesting peer node; and
a request forwarding mechanism configured to forward, responsive to the multi-media content not mapped to the other local peer node, from the local cache and directory server, the request to the central directory server.

12. The system of claim 11, wherein the local cache and directory server further comprises a transmission mechanism configured to allow the requesting peer node to download segments for the multi-media content from the cache and directory server based on the presence of segments for the multi-media content in the cache.

13. The system of claim 11, wherein the local cache and directory server further comprises a downloading mechanism configured to obtain and store segments for the multi-media content in the cache based on the absence of the segments in the cache.

14. The system of claim 13, wherein while obtaining segments for the multi-media content, the downloading mechanism is configured to receive the segments from a plurality of peer nodes.

15. The system of claim 13, wherein while obtaining a copy of a respective segment, the downloading mechanism is configured to receive a copy of the segment from a content file server.

16. The system of claim 11, wherein while maintaining the mapping, the mapping table is configured to associate one such local partner node with the multi-media content in response to a message indicating that the local partner node transiently stages segments for the multi-media content.

17. The system of claim 11, wherein the local cache and directory server further comprises a segment receiving mechanism configured to receive a segment the transfer of which is initiated by a content file server.

18. The system of claim 11, wherein the local peer node comprises:
a requesting mechanism configured to send a first request identifying the multi-media content divided into segments; and
a redirected-request-receiving mechanism configured to re-direct a request from a gateway router at the local cache and directory server, originated at a local requesting peer node, identifying the multi-media content, wherein the gateway router has determined that the re-directed request is a P2P request;

a receiving mechanism configured to receive from a local cache and directory server identifiers of one or more local partner nodes that transiently stage segments for the multi-media content;

wherein the requesting mechanism is further configured to send a second request to a central directory server based on the insufficiency of bandwidth provided by the local partner nodes for presentation of the multi-media content.

19. The system of claim 18, wherein both the first and second requests are directed to a central directory server; and wherein in response to the second request, the receiving mechanism within the local peer node is configured to receive identifiers of one or more content file servers and non-local partner nodes that transiently stage segments for the multi-media content.

20. The system of claim 19, wherein the requesting mechanism is configured to specify the identifier of the local cache and directory server for the first and second requests, thereby allowing the first and second requests to be delivered to the local cache and directory server.

* * * * *